United States Patent
Xie et al.

(10) Patent No.: US 9,611,100 B2
(45) Date of Patent: Apr. 4, 2017

(54) LOAD-BEARING ROLLER AND CONVEYING DEVICE USING SAME

(71) Applicants: HONGFUJIN PRECISION ELECTRONICS (CHENGDU) Co., Ltd., Chengdu (CN); HON HAI PRECISION INDUSTRY CO., LTD., New Taipei (TW)

(72) Inventors: Gang Xie, Shenzhen (CN); Xing-Zheng Li, Shenzhen (CN)

(73) Assignees: HONGFUJIN PRECISION ELECTRONICS (CHENGDU) Co., Ltd., Chengdu (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/075,390

(22) Filed: Mar. 21, 2016

(65) Prior Publication Data

US 2017/0036864 A1     Feb. 9, 2017

(30) Foreign Application Priority Data

Aug. 5, 2015  (CN) .......................... 2015 2 0581560

(51) Int. Cl.
*B65G 13/06*  (2006.01)
*B65G 39/02*  (2006.01)
*B65G 13/02*  (2006.01)

(52) U.S. Cl.
CPC ............. *B65G 39/02* (2013.01); *B65G 13/02* (2013.01)

(58) Field of Classification Search
CPC .... B65G 13/06; B65G 13/071; B65G 13/073; B65G 47/268
USPC .......................... 198/781.01, 781.02, 781.11
See application file for complete search history.

(56) References Cited

U.S. PATENT DOCUMENTS

| | | | | |
|---|---|---|---|---|
| 4,421,224 A * | 12/1983 | Dingman | ............. | B65G 47/261 198/781.02 |
| 4,706,801 A * | 11/1987 | Vessey | ................. | B65G 47/261 198/781.02 |
| 4,832,656 A * | 5/1989 | Rado | ..................... | F16D 43/211 198/781.02 |
| 6,454,082 B1 * | 9/2002 | McTaggart | ........... | B65G 1/1376 198/781.02 |
| 6,502,690 B1 * | 1/2003 | Specht | .................. | B65G 13/07 198/781.07 |

(Continued)

*Primary Examiner* — James R Bidwell
(74) *Attorney, Agent, or Firm* — Zhingang Ma (57) ABSTRACT

A load-bearing roller for conveying items includes an outer cylinder and a transmission assembly. The transmission assembly includes a bushing rotatably mounted in an end of the outer cylinder, a transmission member, and a retracting member. The transmission member includes a transmission wheel and a toothed gear non-rotatably coupled to the transmission wheel. The transmission wheel is positioned outside the outer cylinder. The toothed gear is positioned in the bushing. The retracting member is mounted in the bushing. A free end of the retracting member engages with the gear teeth to urge rotation of the bushing and the outer cylinder. When the roller is jammed or prevented from rotating, the retracting member retracts over the teeth of the toothed gear so as to prevent overload of a prime mover. The disclosure also includes a conveying device using the load-bearing roller.

18 Claims, 5 Drawing Sheets

(56) References Cited

U.S. PATENT DOCUMENTS

| | | | |
|---|---|---|---|
| 7,387,199 B2* | 6/2008 | Cheng | B65H 27/00 198/781.02 |
| 2008/0236998 A1* | 10/2008 | Shurko | B65G 13/071 198/781.02 |

* cited by examiner

LOAD-BEARING ROLLER AND CONVEYING DEVICE USING SAME

FIELD

The subject matter herein generally relates to a roller, and to a conveying device using the roller.

BACKGROUND

A roller, usually with a number of others, is used in a conveying device in order to convey objects.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a load-bearing roller. The load-bearing roller can include an outer cylinder and a transmission assembly. The transmission assembly can include a bushing rotatably mounted in an end of the outer cylinder, a transmission member, and a retracting member. The transmission member can include a transmission wheel and a toothed gear non-rotatably coupled to the transmission wheel. The transmission wheel can be positioned outside the outer cylinder, and the toothed gear can be positioned in the bushing. The retracting member can be mounted on an inner surface of the bushing. A free end of the retracting member can engage with the toothed gear, thereby allowing the bushing and the outer cylinder to rotate with the toothed gear. When the bushing and the outer cylinder are prevented from rotating under an external force, the retracting member can retract repeatedly over the teeth of the toothed gear, due to an increased rotating torque of the bushing.

The present disclosure is described in relation to a conveying device. The conveying device can include supporting frame, a plurality of load-bearing rollers rotatably mounted on the supporting frame, a chain, and a driving member. Each load-bearing roller can include an outer cylinder and a transmission assembly. The transmission assembly can include a bushing rotatably mounted in an end of the outer cylinder, a transmission member, and a retracting member. The transmission member can include a transmission wheel and a toothed gear non-rotatably coupled to the transmission wheel. The transmission wheel can be positioned outside the outer cylinder, and the toothed gear can be positioned in the bushing. The retracting member can be mounted on an inner surface of the bushing. A free end of the retracting member can engage with the toothed gear, thereby rotating the bushing and the outer cylinder with the toothed gear. When the bushing and the outer cylinder are prevented from rotating under an external force, the retracting member can retract repeatedly over the teeth of the toothed gear. The chain can couple with the transmission wheels of the plurality of load-bearing rollers. The driving member can be configured for driving the chain to rotate.

Figure 1:
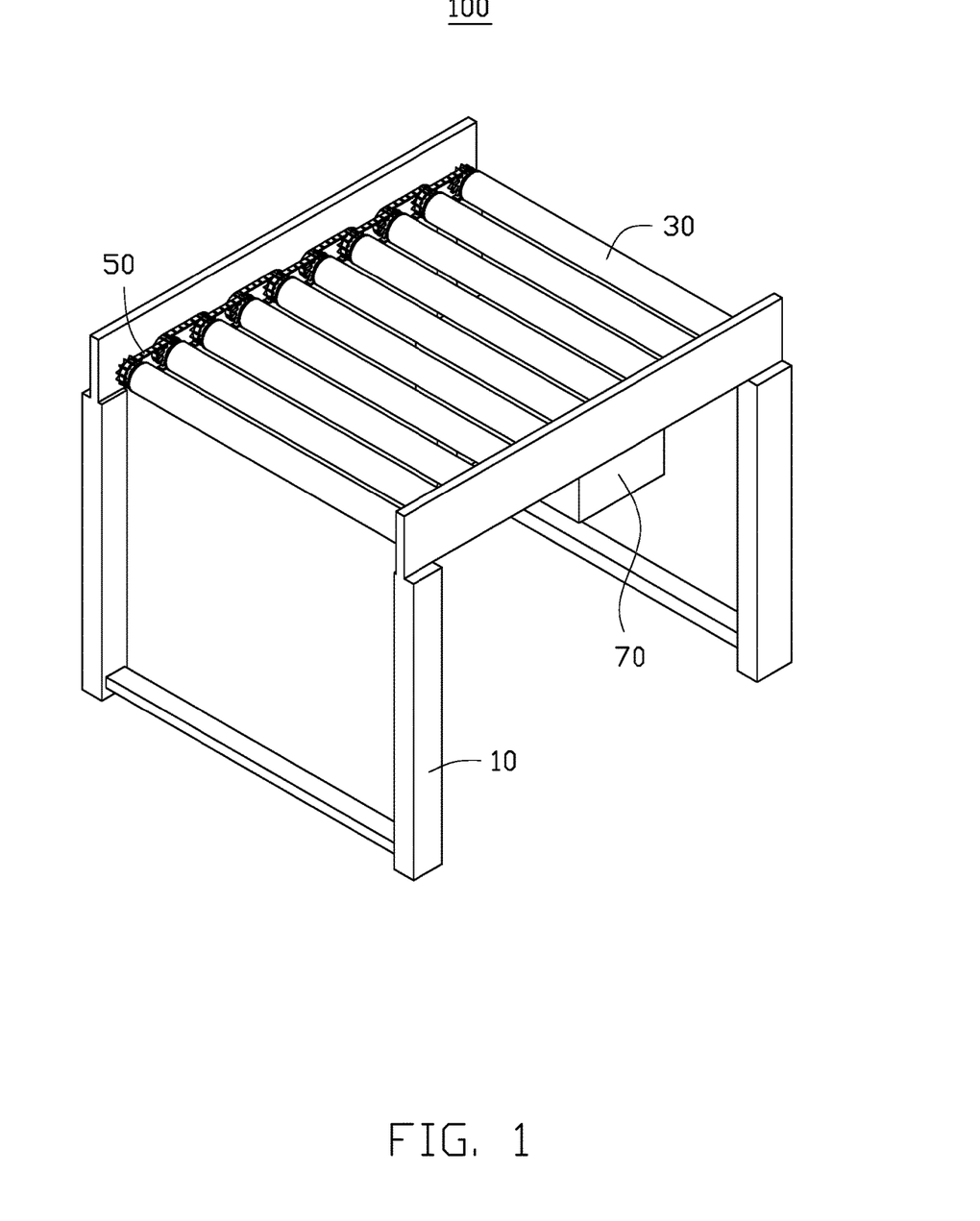
FIG. 1 is a isometric view of an embodiment of a conveying device.

FIG. 1 illustrates a conveying device for conveying objects such as containers or packages. The conveying device can include a supporting frame 10, a plurality of load-bearing rollers 30, a chain 50, and a driving member 70. The plurality of load-bearing rollers 30 can be rotatably mounted on the supporting frame 10. The chain 50 can be configured for coupling with the plurality of load-bearing rollers 30. The driving member 70 can be configured for driving the chain 50 to rotate.

Figure 2:
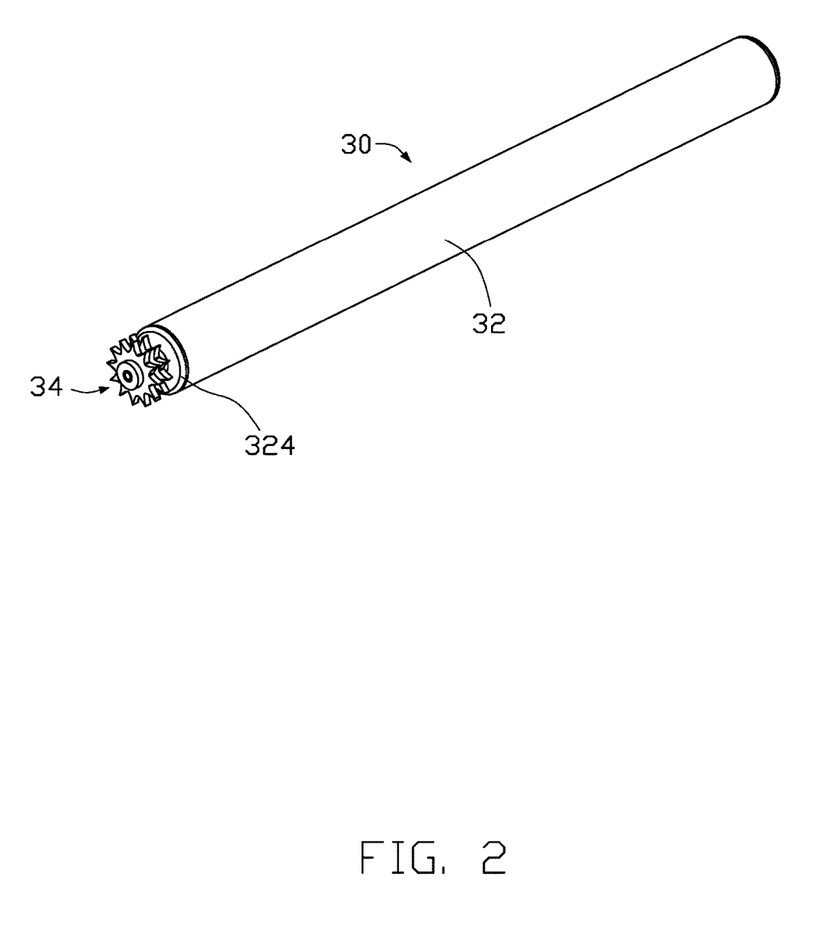
FIG. 2 is a diagrammatic, isometric view of a load-bearing roller of the conveying device of FIG. 1.
Figure 3:
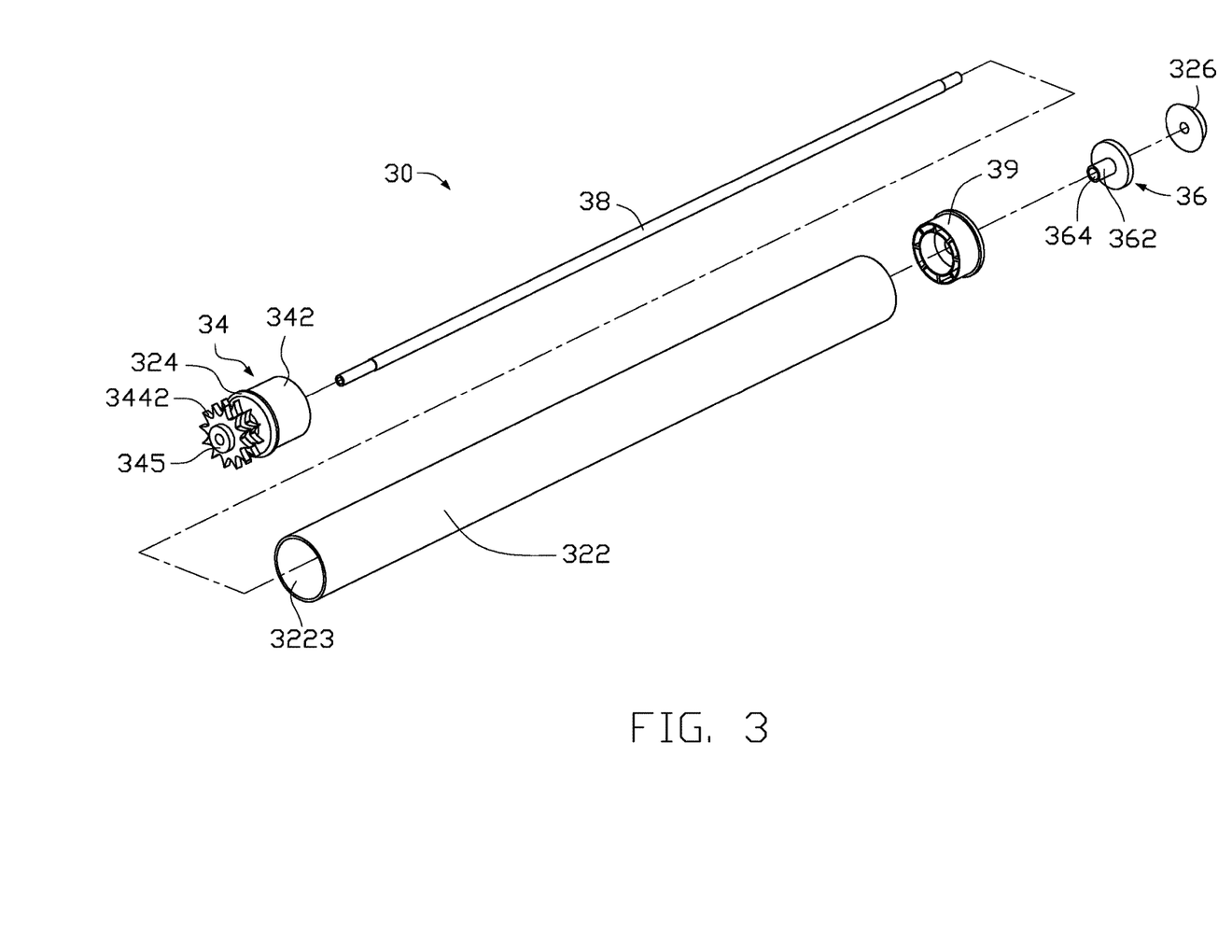
FIG. 3 is an exploded, isometric view of the load-bearing roller of FIG. 2.

FIGS. 2-3 illustrate a load-bearing roller 30 in the illustrated embodiment. Each load-bearing roller 30 can include an outer cylinder 32, a transmission assembly 34, a mounting base 36, and a supporting shaft 38. The transmission assembly 34 and the mounting base 36 can be mounted at opposite ends of the outer cylinder 32. The supporting shaft 38 can be received in the outer cylinder 32. The ends of the supporting shaft 38 can be mounted on the transmission assembly 34 and the mounting base 36.

In the illustrated embodiment, the outer cylinder 32 can include a roller body 322, a first cap 324, and a second cap 326. The roller body 322 can be a substantially hollow cylinder and define a receiving chamber 3223 passing through opposite ends of the roller body 322. The first cap 324 and the second cap 326 can be mounted on opposite ends of the roller body 322 in order to cover the receiving chamber 3223. Also referring to FIG. 4, the transmission assembly 34 can include a bushing 342, a transmission member 344, and a retracting member 346. The bushing 342 can be a substantially hollow cylinder and can be rotatably received in the receiving chamber 3223 adjacent to the first cap 324. The transmission member 344 can be rotatably mounted on an end of the roller body 322 adjacent to the first cap 324. The transmission member 344 can include a transmission wheel 3442 and a toothed gear 3445 non-rotatably coupled to the transmission wheel 3442. The transmission wheel 3442 can be positioned outside the roller body 322 and be coupled to and rotated with the chain 50. The toothed gear 3445 can be located in the bushing 342 and configured to rotate with the transmission wheel 3442. The toothed gear 3445 can define a central hole 3447 configured for receiving the supporting shaft 38. Also referring to FIG. 3, the transmission assembly 34 can further include a rotating shaft 345. The rotating shaft 345 can pass through the first cap 324 and be partially located in the bushing 342. The transmission wheel 3442 and the toothed gear 3445 can be coaxially rotated via the rotating shaft 345. In the illustrated embodiment, the number of transmission wheels 3442 can be two. The transmission wheels 3442 can be removably fixed on the rotating shaft 345. The toothed gear 3445 can be integrally formed on an end of the rotating shaft 345 and can be located in the bushing 342. In other embodiments, the toothed gear 3445 can be detachably mounted on the rotating shaft 345.

Figure 4:
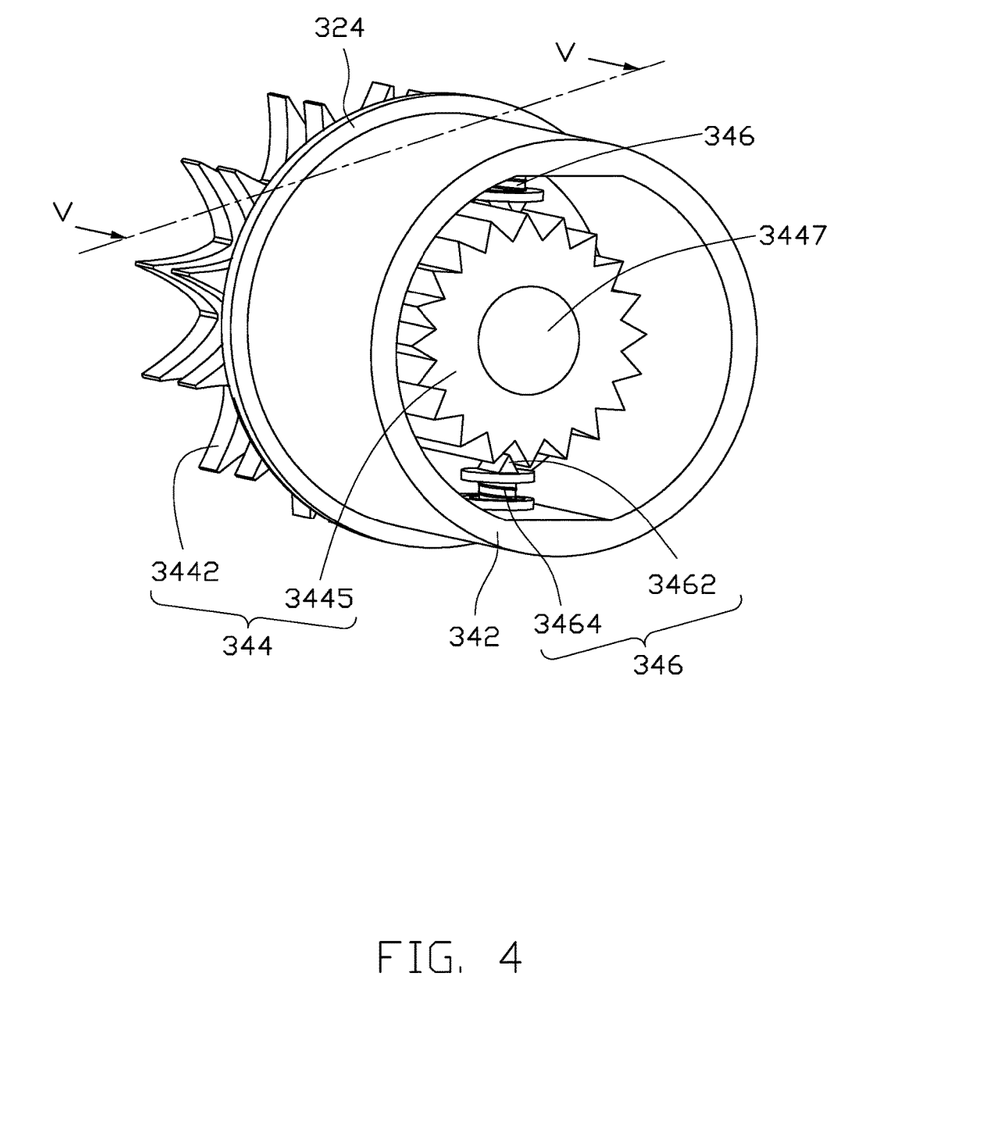
FIG. 4 is an enlarged, isometric view of a transmission assembly and a cap of the load-bearing roller of FIG. 3, from another angle.

In the illustrated embodiment, the retracting member 346 can include an engaging tab 3462 and a spring 3464. One end of the spring 3464 can be mounted on an inner surface of the bushing 342, and the other end of the spring 3464 can urge against the engaging tab 3462. A free end of the engaging tab 3462 can be inserted into the valley between two adjacent teeth of the toothed gear 3445.

Figure 5:
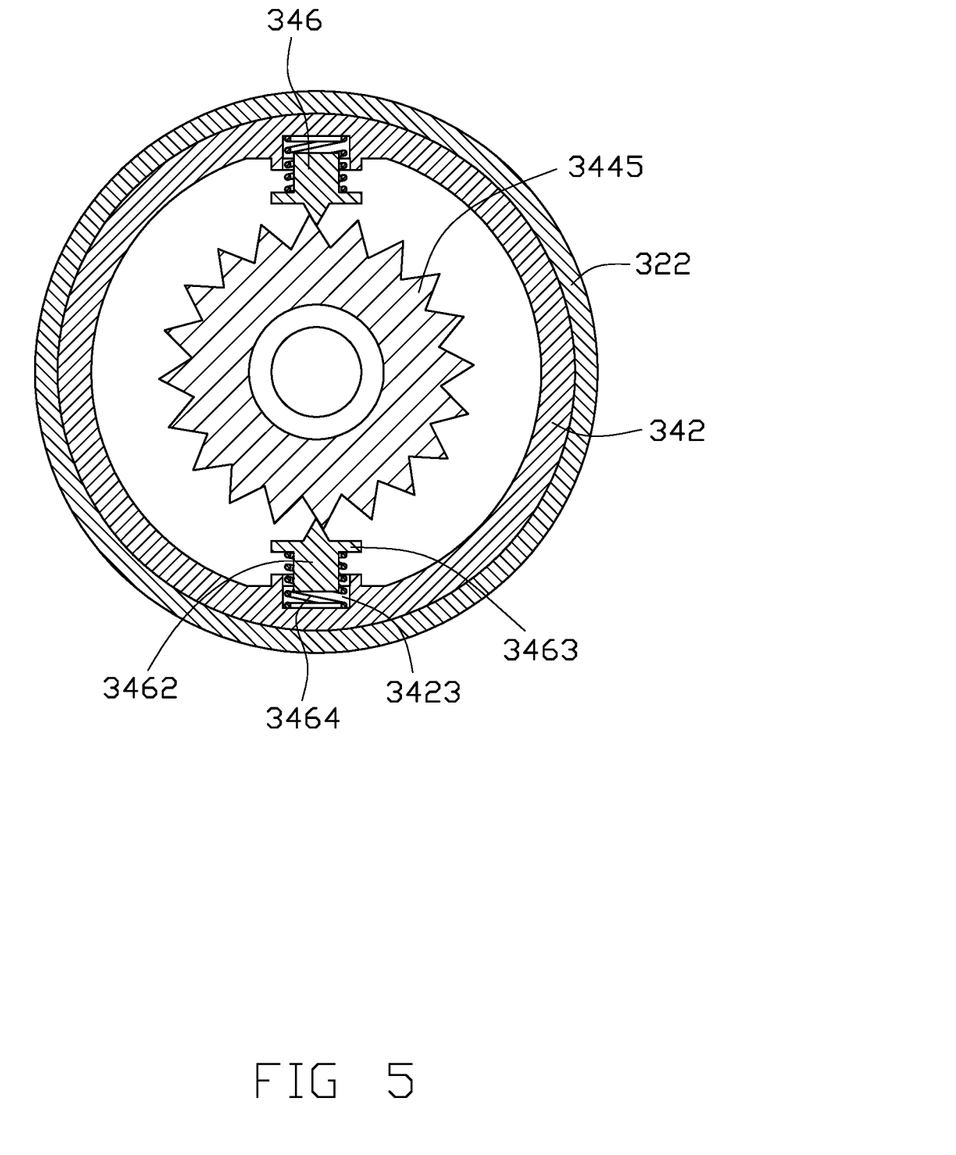
FIG. 5 is a cross-sectional view of the transmission assembly and the cap of FIG. 4, taken along the section plane V-V line.

FIG. 5 illustrates the inner surface of the bushing 342. A guiding groove 3423 is defined therein, configured for guiding the retracting movement of the retracting member 346. The spring 3464 can be partially received in the guiding groove 3423. An end of the spring 3464 can be mounted on a bottom surface of the guiding groove 3423. The engaging tab 3462 can include a resisting portion 3463 protruding around a side surface of the engaging tab 3462. One end of the engaging tab 3462 can be inserted into the spring 3464 and spaced from the bottom surface of the guiding groove 3423, the other end of the engaging tab 3462 can be inserted into the toothed slot of the toothed gear 3445. In the illustrated embodiment, the number of retracting members 346 and of guiding grooves 3423 can be two. The two guiding grooves 3423 can be oppositely located, that is, at 180 degrees from each other, on the inner surface of the bushing 342. Each retracting member 346 can be mounted in a guiding groove 3423.

FIG. 3 illustrates that the mounting base 36 can be mounted on an end of the roller body 322, adjacent to the second cap 326. The mounting base 36 can include an elongated portion 362. The elongated portion 362 can define a mounting hole 364. The two ends of the supporting shaft 38 can be mounted in the mounting hole 364 and the central hole 3447. The load-bearing rollers 30 can further include a mounting sleeve 39 mounted in the receiving chamber 3223 adjacent to the second cap 326. The mounting sleeve 39 can be sleeved on the elongated portion 362. An annular cavity (not shown) for mounting a bearing (not shown) can be cooperatively defined between the mounting sleeve 39 and the elongated portion 362.

In assembly, the toothed gear 3445 can be received in the bushing 342 and the rotating shaft 345 can run through the first cap 324. Two transmission wheels 3442 can be separately sleeved on the rotating shaft 345 and positioned outside the bushing 342. Two retracting members 346 can be mounted on the inner surface of the bushing 342 and the free end of the engaging tab 3462 can be inserted into the valley between teeth of the toothed gear 3445. The bushing 342 can be received and mounted in the receiving chamber 3223. The first cap 324 can be mounted on an end of the roller body 322 to cover the receiving chamber 3223. An end of the supporting shaft 38 can be inserted into the central hole 3447 of the toothed gear 3445. The mounting sleeve 39 can be received and mounted in the receiving chamber 3223 away from the first cap 324. The mounting base 36 can be mounted on an end of the roller body 322 and the elongated portion 362 can be inserted into the mounting sleeve 39 and sleeved on an end of the supporting shaft 38 away from the first cap 324. The second cap 326 can be mounted on an end of the roller body 322 away from the first cap 324 to cover the receiving chamber 3223.

In use, objects to be conveyed (not shown) can be laid on the load-bearing rollers 30. The chain 50 can be rotated by the driving member 70, which allows the transmission wheel 3442 and the toothed gear 3445 to rotate together. The engaging tab 3462 in the valley between two teeth can engage with the toothed gear 3445 and can rotate with the toothed gear 3445, thus driving the bushing 342 to rotate. The roller body 322 rotates together with the bushing 342 due to a frictional force between the bushing 342 and the roller body 322, thereby conveying the objects. The plurality of items can jam up or stop moving for some reason on the end portion of the conveying device 100. Then, a frictional force between the bushing 342 and the roller body 322 is increased, so that the rotating torque of the bushing 342 is increased. The rotating force applied on the retracting members 346 can be therefore increased. Then rotating toothed gear 3445 can still rotate as the retracting members 346 retract as necessary over the teeth running beneath it. The rotational movement of each or any load-bearing roller 30, positioned at the end portion of the conveying device 100 or at some other location, can be stopped. The transmission member 344 can be idle, preventing the driving member 70 from being overloaded. Other load-bearing rollers 30 of the conveying device 100 can keep rotating independently of the stopped load-bearing rollers 30.

In other embodiments, the spring 3464 is not sleeved on the engaging tab 3462 so long as opposite ends of the spring 3464 are mounted on the bottom surface of the bushing 342 and the engaging tab 3462. The number of retracting members 346 can be one or more than one. The retracting member 346 can be an elastic member. Such an elastic member can be mounted on the inner surface of the bushing 342 and can be inserted into the valleys between teeth of the toothed gear 3445.

The embodiments shown and described above are only examples. Many details are often found in the art such as the other features of a load-bearing roller and a conveying device using the load-bearing roller. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A load-bearing roller comprising:
an outer cylinder; and
a transmission assembly comprising:
a bushing rotatably mounted in an end of the outer cylinder;
a transmission member comprising;
a transmission wheel positioned outside the outer cylinder, and
a toothed gear non-rotatably coupled to the transmission wheel positioned in the bushing; and
a retracting member mounted on an inner surface of the bushing;
wherein the outer cylinder is sleeved on the bushing, and a free end of the retracting member engages with the toothed gear, thereby allowing the bushing and the outer cylinder to rotate with the toothed gear; and
wherein when the bushing and the outer cylinder are prevented from rotating under an external force, the retracting member is configured to retract repeatedly due to an increased rotating torque of the bushing.

2. The load-bearing roller of claim 1, wherein the retracting member comprises an engaging tab and a spring, one end of the spring is mounted on the inner surface of the bushing, the other end of the spring is coupled to the engaging tab, a free end of the engaging tab is inserted into a valley between two adjacent teeth of the toothed gear.

3. The load-bearing roller of claim 2, wherein the inner surface of the bushing defines a guiding groove, the spring is partially received in the guiding groove, an end of the spring is mounted on a bottom surface of the guiding groove, the engaging tab has a resisting portion protruding around a side surface of the engaging tab, one end of the engaging tab is inserted into the spring and spaced from the bottom surface of the guiding groove.

4. The load-bearing roller of claim 1, wherein the toothed gear defines a central hole, the load-bearing roller further comprises a mounting base and a supporting shaft, the mounting base is mounted on an end of the outer cylinder away from the transmission assembly, two ends of the supporting shaft are mounted in the mounting base and the central hole.

5. The load-bearing roller of claim 4, wherein the mounting base comprises an elongated portion, the elongated portion defines a mounting hole, an end of the supporting shaft away from the central hole are located in the mounting hole.

6. The load-bearing roller of claim 5, wherein the load-bearing rollers further comprises a mounting sleeve, the mounting sleeve is mounted in the outer cylinder away from the transmission assembly and sleeved on the elongated portion.

7. The load-bearing roller of claim 1, wherein the number of the retracting member is two, two retracting members are oppositely located on the inner surface of the bushing.

8. The load-bearing roller of claim 1, wherein the outer cylinder comprises a roller body, a first cap and a second cap, the roller body is a hollow cylinder, the first cap and a second cap are mounted and covered on two opposite ends of the roller body, the transmission assembly further comprises a rotating shaft, the rotating shaft passes through the first cap and is partially located in the bushing, the transmission wheel and the toothed gear are connected and coaxially rotated via the rotating shaft.

9. The load-bearing roller of claim 8, wherein the number of the transmission wheels is two, two transmission wheels are separately and removably fixed on the rotating shaft.

10. A conveying device comprising:
a supporting frame;
a plurality of load-bearing rollers rotatably mounted on the supporting frame, each load-bearing roller comprises:
an outer cylinder; and
a transmission assembly comprising:
a bushing rotatably mounted in an end of the outer cylinder;
a transmission member comprising;
a transmission wheel positioned outside the outer cylinder, and
a toothed gear non-rotatably coupled to the transmission wheel positioned in the bushing; and
a retracting member mounted on an inner surface of the bushing;
a chain coupling with the transmission wheels of the plurality of load-bearing rollers; and
a driving member configured for driving the chain to rotate;
wherein the outer cylinder is sleeved on the bushing, and a free end of the retracting member engages with the toothed gear, thereby allowing the bushing and the outer cylinder to rotate with the toothed gear; and
wherein when the bushing and the outer cylinder are prevented from rotating under an external force, the retracting member is configured to retract repeatedly due to an increased rotating torque of the bushing.

11. The conveying device of claim 10, wherein the retracting member comprises an engaging tab and a spring, one end of the spring is mounted on the inner surface of the bushing, the other end of the spring is coupled to the engaging tab, a free end of the engaging tab is inserted into a valley between two adjacent teeth of the toothed gear.

12. The conveying device of claim 11, wherein the inner surface of the bushing defines a guiding groove, the spring is partially received in the guiding groove, an end of the spring is mounted on a bottom surface of the guiding groove, the engaging tab has a resisting portion protruding around a side surface of the engaging tab, one end of the engaging tab is inserted into the spring and spaced from the bottom surface of the guiding groove.

13. The conveying device of claim 10, wherein the toothed gear defines a central hole, the load-bearing roller further comprises a mounting base and a supporting shaft, the mounting base is mounted on an end of the outer cylinder away from the transmission assembly, two ends of the supporting shaft are mounted in the mounting base and the central hole.

14. The conveying device of claim 13, wherein the mounting base comprises an elongated portion, the elongated portion defines a mounting hole, an end of the supporting shaft away from the central hole are located in the mounting hole.

15. The conveying device of claim 14, wherein the load-bearing rollers further comprises a mounting sleeve, and the mounting sleeve is mounted in the outer cylinder away from the transmission assembly and sleeved on the elongated portion.

16. The conveying device of claim 10, wherein the number of the retracting member is two, two retracting members are oppositely located on the inner surface of the bushing.

17. The conveying device of claim 10, wherein the outer cylinder comprises a roller body, a first cap and a second cap, the roller body is a hollow cylinder, the first cap and a second cap are mounted and covered on two opposite ends of the roller body, the transmission assembly further comprises a rotating shaft, the rotating shaft passes through the first cap and is partially located in the bushing, the transmission wheel and the toothed gear are connected and coaxially rotated via the rotating shaft.

18. The conveying device of claim 17, wherein the number of the transmission wheel is two, two transmission wheels are separately and removably fixed on the rotating shaft.

\* \* \* \* \*